United States Patent

Hatke et al.

[11] Patent Number: 5,856,414
[45] Date of Patent: Jan. 5, 1999

[54] CYCLOOLEFIN POLYMERS

[75] Inventors: Wilfried Hatke, Hofheim; Frank Osan, Kelkheim, both of Germany

[73] Assignee: Hoechst Aktiengesellschaft, Frankfurt, Germany

[21] Appl. No.: 932,300

[22] Filed: Sep. 17, 1997

Related U.S. Application Data

[60] Continuation of Ser. No. 762,565, Dec. 9, 1996, abandoned, which is a division of Ser. No. 500,658, Jul. 11, 1995, Pat. No. 5,623,039.

[30] Foreign Application Priority Data

Jul. 13, 1994 [DE] Germany ............... 44 25 409.1

[51] Int. Cl.⁶ .................................................. C08F 232/08
[52] U.S. Cl. ..................... 526/160; 526/159; 526/281; 526/308; 526/348; 526/348.6; 526/283; 526/943
[58] Field of Search ..................... 576/281, 943, 576/160, 159, 308

[56] References Cited

U.S. PATENT DOCUMENTS

| | | |
|---|---|---|
| 3,884,888 | 5/1975 | Collette et al. . |
| 4,969,741 | 11/1990 | Kennedy et al. . |
| 5,003,019 | 3/1991 | Ishimaru et al. . |
| 5,087,677 | 2/1992 | Brekner ................................ 526/160 |
| 5,623,039 | 4/1997 | Hatke ................................... 526/281 |

FOREIGN PATENT DOCUMENTS

| | | |
|---|---|---|
| 0156464 | 10/1985 | European Pat. Off. . |
| 0203799 | 12/1986 | European Pat. Off. . |
| 0407870 | 1/1991 | European Pat. Off. . |
| 0441548 | 8/1991 | European Pat. Off. . |
| 2421838 | 1/1975 | Germany . |
| 4030399 | 4/1992 | Germany . |
| 957105 | 5/1964 | United Kingdom . |
| 9324539 | 12/1993 | WIPO . |

*Primary Examiner*—Fred Zitomer
*Attorney, Agent, or Firm*—Frommer Lawrence & Haug LLP

[57] ABSTRACT

The present invention relates to a cycloolefin polymer having a solution viscosity >0.25 dl/g and containing polymerized units of at least one cycloolefin and, if desired, polymerized units of one or more acyclic olefins, wherein the cycloolefin polymer has at one or both ends an olefinically unsaturated group having at least 3 carbon atoms.

6 Claims, No Drawings

CYCLOOLEFIN POLYMERS

This is a continuation of application Ser. No. 08/762,565 filed Dec. 9, 1996, abandoned which is a division of application Ser. No. 08/500,658 filed Jul. 11, 1995, now U.S. Pat. No. 5,623,039 which issued Apr. 22, 1997.

The invention relates to cycloolefin polymers (COP) having terminal olefinically unsaturated groups and a solution viscosity (VN, eta) >0.25.dl/g (at 135° C. in decalin in accordance with DIN 53728) and also functionalized cycloolefin polymers and block copolymers derived therefrom and also to a process for preparing these polymers.

Thermoplastic cycloolefin polymers are described in the literature (EP 203 799, EP 283 164, DE 2 421 838, EP 156 464, EP 407 870). They have a series of technologically important properties such as low water absorption, high shape stability on heating, high moduli of elasticity and resistance to hydrolysis. However, they are difficult to mix with other materials, in particular polymers, and have poor adhesion properties. In addition, they are difficult to functionalize.

EP-A 441 548 describes the preparation of copolymers having olefinically unsaturated end groups by copolymerization of ethylene and alpha-olefins having up to 18 carbon atoms using Ziegler/Natta catalysts. WO 911 488, DE 4 030 399 and WO 9 324 539 describe the preparation of homopolymers and copolymers having olefinically unsaturated end groups by polymerization of ethylene and alpha-olefins using metallocene catalysts. Pure polypropylene oligomers having various end groups are described in DE 4 030 399. The hitherto known polymers having terminal, olefinically unsaturated groups are usually oils or waxes having low melting points, which polymers can be used in functionalized form as dispersants in fuels and motor oils, as viscosity modifiers or as emulsifiers.

It is thus an object of the invention to find a polymer which avoids the disadvantages of the prior art.

The present invention accordingly provides a cycloolefin polymer having a solution viscosity >0.25 dl/g and containing polymerized units of at least one cycloolefin and, if desired, polymerized units of one or more acyclic olefins, wherein the cycloolefin polymer has at one or both ends an olefinically unsaturated group having at least 3 carbon atoms.

Preferably, the cycloolefin polymer of the invention has an olefinically unsaturated end group at one end. The cycloolefin polymer contains polymerized units of at least one polycyclic olefin and preferably-also polymerized units of at least one acyclic olefin.

The terminal olefinically unsaturated group having at least 3 carbon atoms preferably has the formula I

where $R^1$, $R^2$, $R^3$ are identical or different and are each a hydrogen atom, a hydrocarbon radical or a halogenated hydrocarbon radical, e.g. $C_1$–$C_{16}$-alkyl, $C_1$–$C_{16}$-aryl, $C_1$–$C_{16}$-alkenyl, $C_1$–$C_{16}$-haloalkyl or $C_1$–$C_{16}$-haloaryl. Furthermore, two of the radicals $R^1$, $R^2$ and $R^3$ can be joined to form a ring. The $C_1$–$C_{16}$-alkyl radical or $C_1$–$C_{16}$-haloalkyl radical can be linear, branched or cyclic. The $C_1$–$C_{16}$-aryl radical can be substituted or unsubstituted. Particular preference is given to linear $C_1$–$C_8$-alkyl radicals.

The olefinically unsaturated group having at least 3 carbon atoms is particularly preferably derived from propylene, 1-butene, 1-pentene, 1-hexene, 1-heptene or 1-octene.

Preference is given to cycloolefin polymers containing 0.1–100% by weight, preferably 0.1–99% by weight, based on the total mass of the cycloolefin polymer, of polymerized units of at least one polycyclic olefin of the formula II, III, IV, V, VI or VII

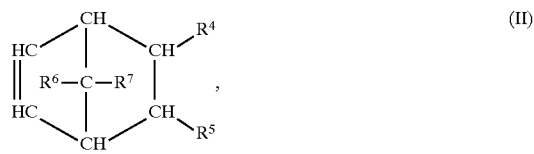

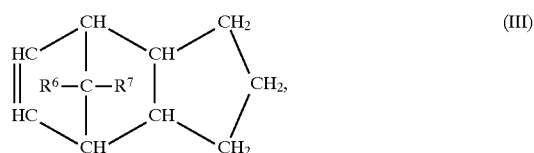

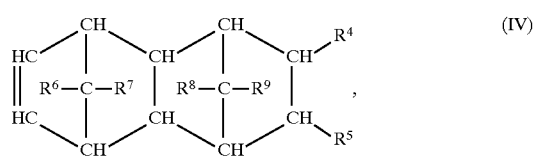

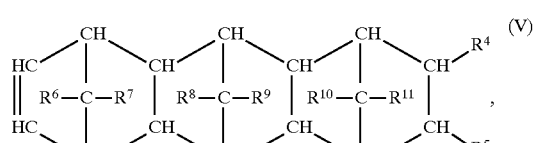

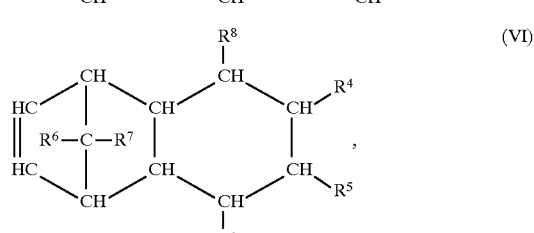

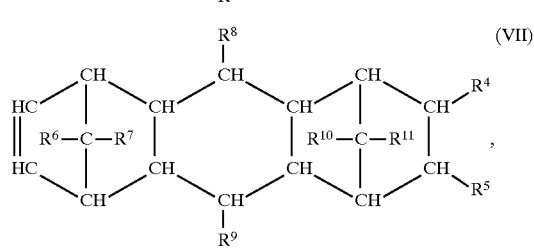

where $R^4$, $R^5$, $R^6$, $R^7$, $R^8$, $R^9$, $R^{10}$ and $R^{11}$ are identical or different and are each a hydrogen atom or a $C_1$–$C_{30}$-hydrocarbon radical, for example a linear or branched $C_1$–$C_8$-alkyl radical, $C_6$–$C_{18}$-aryl radical, $C_7$–$C_{20}$-alkylenearyl radical or a cyclic or acyclic $C_2$–$C_{20}$-alkenyl radical, or two or more radicals $R^4$ to $R^{11}$ are joined cyclically, with identical radicals in the various formulae being able to have a different meaning, from 0 to 45% by weight, based on the total mass of the cycloolefin polymer, of polymerized units of at least one monocyclic olefin of the formula VIII

where n is a number from 2 to 10, from 0 to 99% by weight, based on the total mass of the cycloolefin polymer, of polymerized units of an acyclic olefin of the formula IX

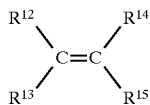 (IX)

where $R^{12}$, $R^{13}$, $R^{14}$, $R^{15}$ are identical or different and are each a hydrogen atom or $C_1$–$C_{10}$-hydrocarbon radical, for example a $C_1$–$C_8$-alkyl radical or $C_6$–$C_{14}$-aryl radical, and an olefinically unsaturated end group having at least 3 carbon atoms.

The cycloolefin polymers preferably contain polymerized units of at least one polycyclic olefin, in particular one of the formula II or IV, and of an acyclic olefin of the formula IX, which preferably has 2–20 carbon atoms, in particular ethylene.

Preference is given to cycloolefin polymers containing polymerized units of polycyclic olefins having a norbornene base structure, particularly preferably norbornene or tetracyclododecene. Preference is also given to cycloolefin polymers containing polymerized units of acyclic olefins, such as alpha-olefins, particularly preferably ethylene. Particular preference is given to norbornene/ethylene and tetracyclododecene/ethylene copolymers having an olefinically unsaturated end group having at least 3 carbon atoms.

The proportion of polymerized units of acyclic olefins of the formula IX is from 0 to 99% by weight, preferably 5–80% by weight, particularly preferably 10–60% by weight, based on the total mass of the cycloolefin polymer.

The cycloolefin polymers of the invention having terminal olefinically unsaturated groups have glass transition temperatures between –20° C. and 400° C., preferably between 50° C. and 200° C. The viscosity number (decalin, 135° C., DIN 53728) is between 25 and 200 ml/g, preferably between 25 and 100 ml/g, particularly preferably between 25 and 50 ml/g.

The cycloolefin polymers of the invention are amorphous polyolefins having high transparency and high shape stability on heating and narrow molecular weight distributions. They can be used for optical components such as lenses, disks, covers; glasses. They are further suitable as starting materials for the preparation of COP having terminal polar functional groups, without gelling occurring during functionalization.

The present invention also provides a process for preparing a cycloolefin polymer having a solution viscosity >0.25 dl/g, in the presence of a transition metal catalyst, which comprises reacting at least one cycloolefin and, if desired, one or more acyclic olefins with less than 25 mol %, based on the total amount of monomers, of an olefin having at least three carbon atoms which is different from the acyclic olefin(s) and the cycloolefin(s).

It has been found that addition of olefins having at least 3 carbon atoms during the polymerization of cycloolefin polymers using transition metal compounds in the presence of a cocatalyst allows cycloolefin polymers having olefinically unsaturated end groups to be synthesized and that the molecular weights of the cycloolefin polymers can be set in a targeted manner by selection of the ratio of the concentration of the olefin having at least 3 carbon atoms to that of the cycloolefin monomers.

Owing to their action in regulating the molecular weight, the olefins having at least 3 carbon atoms will be referred to hereinafter as regulators.

Suitable regulators are linear or branched $C_3$–$C_{18}$-olefins such as propylene, butene, isobutylene, pentene, hexene, heptene, octene, 4-methylpentene, butadiene, isoprene, or cyclic olefins such as cyclopentene, cyclohexene, vinylcyclohexane, vinylnorbornene, vinylcyclohexene, cyclopentadiene, dicyclopentadiene, styrene or α-methylstyrene.

For preparing the cycloolefin polymers according to the invention, the regulator is introduced into the monomer mixture before the polymerization is started. The regulators are introduced into the monomer mixture in the desired concentration. In the case of the gaseous olefins, the concentration can be set by adjustment of the partial pressure at the respective temperature. The concentration of the liquid olefins can be set simply by addition of the appropriate amount. The concentrations of the regulator are between 0.001 mol and 1.5 mol, preferably between 0.01 and 1 mol, based on one liter of the monomer solution. After addition of the polymerization catalyst, the polymerization can be continued as described for cycloolefin polymers in EP 203 799, EP 283 164, DE 2 421 838, EP 156 464 or EP 407 870, which are hereby expressly incorporated by reference. The polymerization can be carried out continuously or batchwise.

The regulator consumed in the polymerization can be further metered in continuously during the polymerization. The polymerization activities of the metallocene catalysts used are generally not impaired by the addition of the regulators. For low concentrations, an increase in the polymerization activities can even be observed. This behavior is of particular interest for the economical preparation of the cycloolefin polymers having olefinically unsaturated terminal groups.

The process of the invention operates at temperatures of from –78° to 150° C. and a pressure of from 0.01 to 64 bar, in the presence of one or more catalysts which contain at least one cocatalyst and at least one transition metal compound. Such catalyst systems are -described in, for example, EP 203 799, EP 283 164, P 43 04 309.7, P 43 04 308.9 or DE 2 421 838, which are hereby expressly incorporated by reference. Preference is given to metallocene-aluminoxane catalyst systems European Patent Application 0 203 799 A1 (EP 203 799) describes the copolymerization of cycloolefins and ethylene in the presence of a soluble vanadium compound and an organoaluminum compound of the formula $VO(OR)_aX_b$ or $VO(OR)_cX_d$ wherein R is a hydrocarbon and X is halogen and $R^{13}{}_m Al(OR^{14})_r H_p X_q$ wherein $R^{13}$ and $R^{14}$ are hydrocarbons and X is halogen, respectively. European Patent Specification o 283 164 B1 (EP 263 164) describes the polymerization of alpha-olefins and cycloolefins (and optimally cyclic polyenes) in the presence of a catalyst consisting of a zirconium compound characterized by a ligand having at least two indenyl (or substituted indenyl groups or partially hydrogenated groups) and an aluminoxane of the formula

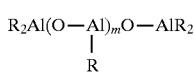

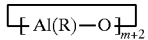

wherein R is a hydrocarbon.

German Patent 43 04 309.7 (P 43 04 309.7) describes the copolymerization of cycloolefins in the presence of metallocene catalysts, for example, dimethylsilyl-bis-(1-indenyl) -zirconium dichloride, isopropylene(cyclopentadienyl)-(1-indenyl)-zirconium dichloride, among others, and methylaluminoxane. Similarly, German Patent 43 04 308.9 (P 43 04 308.9) describes the copolymerization of cycloolefins in the presence of metallocene catalysis and methylaluminoxane.

Unexamined Disclosure 24 21 838 (DE 2 421 838) describes the homopolymerization of norbornene and the copolymerization of norbornene and ethylene in the presence of titanium salts of the formula $$TiX_{4-n}(OR)_n$$

or $$TiX_3$$

wherein R is a hydrocarbon and X is a halogen and an aluminum organyl of the formula $$AlR_{3-m}X_n$$

wherein X is halogen and R is a hydrocarbon.

Examples of transition metal compounds used are:
rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichloride,
1-silacyclobutylbis(1-indenyl)zirconium dichloride,
rac-diphenylsilylbis(1-indenyl)hafnium dichloride,
rac-phenylmethylsilylbis(1-indenyl)hafnium dichloride,
rac-diphenylsilylbis(1-indenyl)zirconium dichloride,
rac-ethylene-1,2-bis(1-indenyl)zirconium dichloride,
dimethylsilyl(9-fluorenyl) (cyclopentadienyl) zirconium dichloride,
diphenylsilyl(9-fluorenyl) (cyclopentadienyl)zirconium dichloride,
bis(1-indenyl)zirconium dichloride,
diphenylmethylene(9-fluorenyl) cyclopentadienylzirconium dichloride,
isopropylene(9-fluorenyl)cyclopentadienylzirconium dichloride,
phenylmethylmethylene(9-fluorenyl)cyclopentadienyl zirconium dichloride,
isopropylene(9-fluorenyl) (1-(3-isopropyl) cyclopentadienyl)zirconium dichloride,
isopropylene(9-fluorenyl)(1-(3-methyl)cyclopentadienyl) zirconium dichloride
diphenylmethylene(9-fluorenyl)(1-(3-methyl) cyclopentadienyl)zirconium dichloride,
methylphenylmethylene(9-fluorenyl) (1-(3-methyl) cyclopentadienyl)zirconium dichloride,
dimethylsilyl(9-fluorenyl) (1-(3-methyl) cyclopentadienyl)zirconium dichloride,
diphenylsilyl(9-fluorenyl) (1-(3-methyl) cyclopentadienyl)zirconium dichloride,
diphenylmethylene(9-fluorenyl)(1-(3-tert-butyl) cyclopentadienyl)zirconium dichloride,
isopropylene(9-fluorenyl) (1-(3-tert-butyl) cyclopentadienyl)zirconium dichloride,
isopropylene(cyclopentadienyl) (1-indenyl) zirconium dichloride,
diphenylcarbonyl(cyclopentadienyl)(1-indenyl) zirconium dichloride,
dimethylsilyl(cyclopentadienyl)(1-indenyl)zirconium dichloride,
isopropylene(methylcyclopentadienyl)(1-indenyl) zirconium dichloride,
isopropylenebis(1-indenyl)zirconium dichloride,
4-($\eta^5$-cyclopentadienyl)-4,7,7-trimethyl($\eta^5$-4,5,6,7-tetrahydroindenyl)zirconium dichloride
and analogous hafnocenes,
titanium tetrachloride, $VOCl_3$, $VOCl_2$ $(OCH_3)$, $VOCl_2$ $(OC_2H_5)$ and $VOCl$ $(OC_2H_5)_2$.

The invention further provides functionalized cycloolefin polymers having a solution viscosity >0.25 dl/g and containing polymerized units of at least one cycloolefin and, if desired, polymerized units of one or more acyclic olefins, wherein the cycloolefin polymer bears at one or both ends a terminal functional group which is different from olefinically unsaturated end groups.

The terminal functional group preferably has the formula X

  (X)

where $R^{16}$ and $R^{17}$ can be identical or different and are each a hydrogen atom, an aliphatic or aromatic $C_1$–$C_{30}$-hydrocarbon radical, a carboxylic acid anhydride, a silyl or siloxane radical, an oxygen atom, I, Br, CN, Cl, F, OH, OR', OCOR', COOH, COR, COOR', $NH_2$, NHR', $NR'_2$, SOH, $SO_2H$, $SO_3H$, SOR', $SO_2R'$ or $SO_3R'$, with R' being an aliphatic or aromatic $C_1$–$C_{20}$-hydrocarbon radical, and Y is a group

where $R^{18}$, $R^{19}$ and $R^{20}$ can be identical or different and are each a hydrogen atom, an aliphatic or aromatic $C_1$–$C_{30}$-hydrocarbon radical, a carboxylic acid anhydride, a silyl or siloxane radical, an oxygen atom, I, Br, CN, Cl, F, OH, OR", OCOR", COOH, COOR", $NK_2$, NHR", $NR"_2$, SOH, $SO_2H$, $SO_3H$, SOR", $SO_2R"$ or $SO_3R"$, with R" being an aliphatic or aromatic $C_1$–$C_{20}$-hydrocarbon radical, or the two radicals $R^{16}$ and $R^{18}$ are replaced by an oxygen atom so that an epoxide is present. It is also possible for two or more of the radicals $R^{16}$ to $R^{20}$ to be cyclically joined to one another.

Particularly preferred radicals $R^{16}$, $R^{17}$, $R^{18}$, $R^{19}$ and $R^{20}$ are hydroxy, alkoxy, aryloxy, amino, halo, imino, thio, ester, thioester, carboxylic acid, ketone, amide, carboxylic acid anhydride, carboxylate and epoxide end groups.

Preference is given to cycloolefin polymers having those terminal functional groups different from olefinically unsaturated end groups which are obtainable by a polymer-analogous reaction of the cycloolefin polymers of the invention having at one or both ends olefinically unsaturated groups having at least 3 carbon atoms.

The present state of development in organic synthesis offers many reactions for this purpose (Advanced Organic Chemistry, Jerry March, John Wiley & Sons, New York 1985, pages 657–779 describes the addition of various electrophiles, nucleophiles and free-radicals to carbon-to-carbon double or triple bonds to provide functionalized derivatives thereof, or Organikum, VEB Deutscher Verlag der Wissenschaften, Berlin 1986, also describes the addition of various electrophiles, nucleophiles and free-radicals to carbon-to-carbon double and triple bonds to provide functionalized derivatives thereof, which are hereby expressly incorporated by reference). Some examples of reactions are described below:

Cycloolefin polymers having terminal halogens can be obtained by addition of hydrogen halides and halogens. Molecular addition of water makes possible the direct introduction of hydroxy groups. Hydroxy groups can also be introduced at the end of the cycloolefin polymer chain by hydroboration/oxidation. Nucleophilic substitution of the halogens allows hydroxy, alkoxy, aryloxy, amino, imino, thio, cyano or alkyl and aryl groups to be introduced. Cycloolefin polymers having epoxide end groups are obtainable by reaction with, for example, peracids. A maleic anhydride reaction allows the introduction of anhydride groups. Reaction of the OH-terminated cycloolefin polymers makes possible many further compounds such as, for example, esters of carboxylic, mineral and sulfonic acids and silyl esters. The molecular addition of the hydrogenhalides or halogens can be carried out at room temperature or lower temperatures with substantial exclusion of light. In this way, the molecular addition of bromine can be carried out at 10° C. in decalin as solvent. The reaction proceeds quantitatively, as can be seen by the disappearance of the olefinic protons in the $^1$H-NMR spectrum.

The cycloolefin polymers of the invention having terminal functionalized groups which are different from olefinically unsaturated end groups have glass transition temperatures between −20° C. and 400° C., preferably between 50° C. and 200° C. The viscosity number (decalin, 135° C., DIN 53728) is between 25 and 200 ml/g, preferably between 25 and 100 ml/g, particularly preferably between 25 and 50 ml/g.

COPs having terminal functional groups can be used as additives in polymers. COPs having terminal functional groups allow the surface properties of nonpolar polymers to be modified and thus, for example, the printability and adhesion properties to be improved. COPs having terminal functional groups can be used as polymeric emulsifiers for improving the phase adhesion in polymer blends. Reaction of the functional group with a component of the blend enables the phase adhesion to be further optimized. In another application, the COPs having terminal functional groups can be used as viscosity modifiers or flow improvers for crude oils, mineral oils and similar systems.

A further aspect of the invention is block copolymers containing blocks of the functionalized cycloolefin polymers of the invention. The block copolymers can be diblock, triblock, multiblock or star block copolymers, or graft copolymers.

For the purposes of the present invention, cycloolefin polymer block copolymers contain at least one block of the functionalized cycloolefin polymer of the invention and at least one block of a polymer or copolymer which is different from a COP. These polymers or copolymers which are different from COPs can be amorphous or partially crystalline polymers. Preference is given to amorphous polymers or copolymers having glass transitions in the range from −100° to 150° C. Examples of such polymers are polystyrene, polysiloxanes, polyoxytetramethylene, polybutadiene, polyisoprene, polyacrylates, polymethacrylates, poly(styrene-co-butadiene), poly (styrene-co-isoprene).

The diblock, triblock and branched multiblock copolymers can be prepared by suitable coupling methods from cycloolefin polymers having terminal functionalized groups which are different from olefinically unsaturated end groups. The molecular weights of the polymer blocks different from COPs are in the range of $10^4$–$10^6$ g/mol, preferably $10^4$–$10^5$ g/mol. The absolute molecular weights $M_w$ of the cycloolefin polymer blocks are in the range from 5000 to $10^6$ g/mol, preferably from 5000 to $10^5$ g/mol and particularly preferably in the range from 5000 to $10^4$ g/mol. The polydispersity $M_w/M_n$ of the block copolymers is in the range of 1–10, preferably in the range of 1–5 and particularly preferably in the range of 1–3.

The cycloolefin polymer block copolymers of the invention can be prepared, for example, by coupling with anionically polymerized polymers and copolymers. The reaction of cycloolefin polymers having substitutable halogens at the end of the chain with anions results in replacement of the halogen by the anion. This reaction can be exploited for the coupling of a halogenated cycloolefin polymer to the polymerization active anions as occur in anionic polymerization. In this way it is possible to prepare block copolymers from cycloolefin polymers and monomers which can undergo an anionic polymerization. Examples of anionically polymerizable monomers are vinylaromatics such as styrene, alphamethylstyrenes, methylstyrenes, dimethylstyrene, vinylnaphthalene, conjugated dienes such as isoprene, butadiene and acrylate and methacrylate monomers such as, for example, methyl methacrylate, methyl ethyl acrylate, methyl propyl acrylate, methyl acrylate, ethyl acrylate, propyl acrylates, butyl acrylates, pentyl acrylates, hexyl acrylates and higher homologs, cyclohexyl acrylates and substituted cyclohexyl acrylates.

A further aspect of the preparation of block copolymers containing blocks of cycloolefin polymers and anionically preparable polymers is the reaction of cycloolefin polymers having terminal bromo groups and the anions of, for example, polybutadiene, polyisoprene or polystyrene. The cycloolefin polymer having terminal double bonds is dissolved in a solvent which is relatively inert, under the reaction conditions, to bromine and anions, e.g. carbon tetrachloride or decalin, and is slowly reacted at temperatures of from −30° to 50° C. with a solution of bromine in the solvent used for the reaction in such a way that always only a part of the amount of bromine required for complete bromination is added. This procedure is continued until the characteristic color of the bromine solution remains in the reaction solution over a prolonged period (5–60 minutes). The preparation of polybutadiene, polyisoprene or polystyrene by anionic polymerization is carried out by known methods as are described, for example, in *Advances In Polymer Science*, 56, Springer Verlag Berlin (1984). The polymer solution which still contains the anionic chain ends is, after the bromination is complete, added at temperatures of from −30° to 20° C. to the cycloolefin polymer solution. The solution is subsequently allowed to warm to room temperature and left stirring further for some time at temperatures of from 20° to 100° C. A further aspect of the preparation of cycloolefin polymer block copolymers is coupling via condensation processes. Cycloolefin polymers having terminal hydroxy, amino or anhydride groups can be joined to polymers containing, for example, terminal acid, acid chloride, dialkylsilylhalogen, dialkylsilylamino or amino terminal groups to give block copolymers.

Graft copolymers are obtainable by copolymerization of cycloolefin polymers having suitable functionalization and one or more suitable monomers. Thus, cycloolefin polymers having methacryloyl or styryl end groups can be reacted with free-radical-polymerizable monomers to give graft copolymers. The methacryloyl or styryl end groups can be introduced into the cycloolefin polymer by reaction of cycloolefin polymers having, for example, terminal hydroxy or amino end groups and methacryloyl chloride and 4-vinylbenzoyl chloride or 4-vinylbenzyl chloride.

The property spectrum of the block copolymers is dependent on the proportions and properties of the polymers and copolymers which are combined with the cycloolefin copolymers. They can range from thermoplastic elastomers to brittle thermoplastics. The combination of a cycloolefin polymer as matrix with a polymer having a low glass transition temperature (Tg) such as polybutadiene leads to a polymer having good impact toughness. Mixing such a block copolymer into an unmodified cycloolefin polymer likewise improves the impact resistance.

Further applications of such block copolymers are the improvement of the phase adhesion and miscibility of cycloolefin polymers and other polymers. Mixing block copolymers having, for example, polar blocks into cycloolefin polymers allows the surface of these polymers to be modified and thus the adhesion to other materials to be improved. This is very important for printing, painting and varnishing or metallization. Further applications of such block copolymers are emulsifiers, viscosity modifiers and flow improvers.

EXAMPLE 1

A 1.5 dm$^3$ reactor was charged with 1 liter of petroleum spirit (boiling range: 90°–110° C.) and 20 ml of methylaluminoxane solution in toluene (10.1% by weight of methylaluminoxane having a molecular weight of 1300 g/mol determined by cryoscopy) and the mixture was stirred at 70° C. for about 30 minutes to remove any contamination present. After draining the solution, the reactor was charged with 480 cm$^3$ of an 85% strength by weight solution of norbornene in toluene and with 20 cm$^3$ of 1-octene. The solution was saturated with ethylene by multiple pressurization with ethylene (6 bar G) and subsequently 10 cm$^3$ of the methylaluminoxane solution in toluene were added to the reactor and the mixture was stirred for 5 minutes at 70° C. A solution of 5.43 mg of isopropylene (1-cyclopentadienyl) (1-indenyl) zirconium dichloride in 10 cm$^3$ of methylaluminoxane solution in toluene was added after preactivation for 15 minutes. Polymerization was carried out while stirring (750 rpm) for 30 minutes at 70° C., with the ethylene pressure being maintained at 6 bar G by metering in further amounts. The homogeneous reaction solution was drained into a vessel and admixed with about 1 ml of water. The solution is subsequently admixed with a filter aid and filtered through a pressure filter. This solution is quickly poured into 5 dm$^3$ of acetone, stirred for 10 minutes and filtered. The solid obtained was washed with acetone. The refiltered polymer was dried at 80° C. and a pressure of 0.2 bar for 15 hours.

89.1 g of a colorless polymer were obtained. The viscosity number was determined in decalin in accordance with DIN 53728. The solution was measured in a capillary viscometer at 135° C. The viscosity number was 26.3 ml/g. The glass transition temperatures were determined using a DSC7 from Perkin Elmer. The glass transition temperature was determined at a heating rate of 20° C./min from the 2nd heating curve and was 172° C. The content of unsaturated double bonds was determined by means of nuclear magnetic resonance spectroscopy. The ratio of the intensities of olefinic protons to aliphatic protons was 0.065%. The molecular weight of the polymer was determined by means of gel permeation chromatography at 135° C. in ortho-dichlorobenzene. The standards used were polyethylene fractions. The following values were found for the polymer: $M_n$: 5700 g/mol, $M_w$: 13,500 g/mol, $M_w/M_n$: 2.4.

EXAMPLE 2

A 1.5 dm$^3$ reactor was charged with 1 liter of petroleum spirit (boiling range: 90°–110° C.) and 20 ml of methylaluminoxane solution in toluene (10.1% by weight of methylaluminoxane having a molecular weight of 1300 g/mol determined by cryoscopy) and the mixture was stirred at 70° C. for about 30 minutes to remove any contamination present. After draining the solution, the reactor was charged with 470 cm$^3$ of an 85% strength by weight solution of norbornene in toluene and with 30 cm$^3$ of 1-octene. The solution was saturated with ethylene by multiple pressurization with ethylene (6 bar G) and subsequently 10 cm$^3$ of the methylaluminoxane solution in toluene were added to the reactor and the mixture was stirred for 5 minutes at 70° C. A solution of 1.1 mg of isopropylenebis(1-indenyl) zirconium dichloride in 10 cm$^3$ of methylaluminoxane solution in toluene was added after preactivation for 15 minutes.

Polymerization was carried out while stirring (750 rpm) for 1 hour at 70° C., with the ethylene pressure being maintained at 12 bar G by metering in further amounts. The homogeneous reaction solution was drained into a vessel and admixed with about 1 ml of water. The solution is subsequently admixed with a filter aid and filtered through a pressure filter. This solution is quickly poured into 5 dm$^3$ of acetone, stirred for 10 minutes and filtered. The solid obtained was washed with acetone. The refiltered polymer was dried at 80° C. and a pressure of 0.2 bar for 15 hours.

50.8 g of a colorless polymer were obtained. The viscosity number, glass transition, molecular weight, etc. were determined in a similar manner to Example 1. The polymer has the following values: VN=40 ml/g, $T_g$: 183° C., $M_n$: 14,000 g/mol, $M_w$: 30,000 g/mol, $M_w/M_n$: 2.0. The proportion of olefinic protons was 0.058%.

EXAMPLES 3–7

These were carried out using a similar method to Example 1. Various amounts of 1-octene were used. Table 1 summarizes the experimental parameters. The analytical data of the polymers are given in Table 2.

TABLE 1

| Ex. | Catalyst | Catalyst amount mg | Pressure bar | 1-Octene ml | Monomer solution ml | Reaction time min | Yield g |
| --- | --- | --- | --- | --- | --- | --- | --- |
| 3 | 1 | 4.56 | 6 | 5 | 495 | 30 | 46.3 |
| 4 | 1 | 5.02 | 6 | 20 | 480 | 30 | 6.0 |
| 5 | 2 | 1.00 | 12 | 10 | 490 | 60 | 38.3 |
| 6 | 2 | 1.15 | 12 | 60 | 440 | 60 | 26.7 |

Catalyst 1: isopropylene(1-cyclopentadienyl) (1-indenyl)zirconium dichloride
Catalyst 2: isopropylenebis(1-indenyl)zirconium dichloride

TABLE 2

| Ex. | Viscosity number ml/g | $M_w$ g/mol | $M_n$ g/mol | $M_w/M_n$ | Olefinic protons % | $T_g$ °C. |
| --- | --- | --- | --- | --- | --- | --- |
| 3 | 45.7 | 31,900 | 12,600 | 2.53 | not determined | 181 |
| 4 | 26.3 | 13,500 | 5700 | 2.28 | 0.058 | 172 |
| 5 | 39.8 | 61,000 | 26,000 | 2.34 | 0.038 | 149 |
| 6 | 36.4 | 19,000 | 9500 | 2.00 | 0.088 | 121 |

COMPARATIVE EXAMPLE 1

The experiment described in Example 1 was repeated under the same conditions. The change made in this experiment was that no octene was added in the polymerization of the cycloolefin polymer.

40.9 g of a white powder were obtained. The analysis of this material gave the following results: VN=62.7 mg/g, $T_g$=184° C., $M_w$=48,400 g/mol, $M_n$=15,500 g/mol, $M_w/M_n$=3.13. The $^1$H-NMR spectrum of the polymer shows no olefinic protons.

COMPARATIVE EXAMPLE 2

The experiment described in Example 2 was repeated under the same conditions. The change made in this experiment was that no octene was added in the polymerization of cycloolefin polymer.

18.9 g of a white powder were obtained. The analysis of this material gave the following results: VN=172.2 ml/g, $T_g$=153° C., $M_w$=165,000 g/mol, $M_n$=47,000 g/mol, $M_w/M_n$=3.5. The $^1$H-NMR spectrum of the polymer shows no olefinic protons.

We claim:

1. A process for preparing a cycloolefin polymer having a solution viscosity >0.25 ml/g (at 135° C. in decalin in accordance with DIN 53 728) and comprising 0.1–100% by weight, based on the total mass of the cycloolefin polymer of polymerized units of at least one polycyclic olefin of the formulae II, III, IV, V, VI or VII:

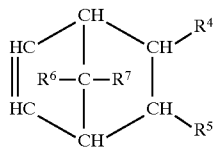
(II)

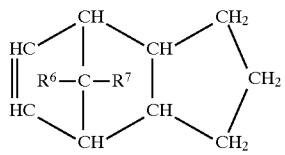
(III)

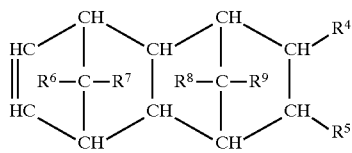
(IV)

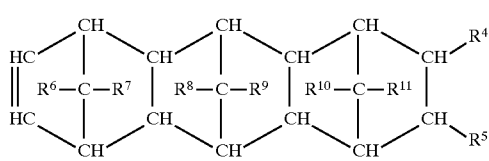
(V)

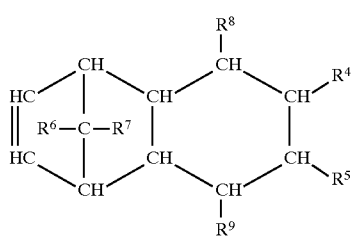
(VI)

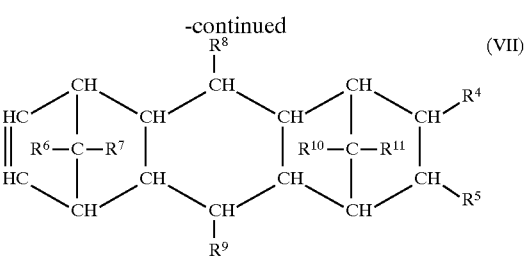
(VII)

wherein $R^4$, $R^5$, $R^6$, $R^7$, $R^8$, $R^9$, $R^{10}$ and $R^{11}$ are identical or different and are each a hydrogen atom or a $C_1$–$C_{30}$-hydrocarbon radical or two or more radicals $R^4$ to $R^{11}$ are joined cyclically, with identical radicals in the various formulae being able to have a different meaning, from 0 to 45% by weight, based on the total mass of the cycloolefin polymer, of polymerized units of at least one monocyclic olefin of the formula VIII

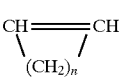
(VIII)

where n is a number from 2 to 10, from 5 to 80% by weight, based on the total mass or the cycloolefin polymer, of polymerized units of an acyclic olefin of the formula IX

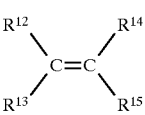
(IX)

where $R^{12}$, $R^{13}$, $R^{14}$, $R^{15}$ are identical or different and are each a hydrogen atom or a $C_1$–$C_8$-alkyl or a $C_6$–$C_8$ alkyl or a $C_6$–$C_{14}$ aryl, wherein the cycloolefin polymer has at one or both ends an olefinically unsaturated group having at least three carbon atoms and wherein the olefinically unsaturated group is produced from an olefin that is different from the cycloolefins of the formulae II–VIII and the acyclic olefins of the formula IX and has the formula I

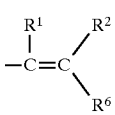
(I)

where any of $R^1$, $R^2$, $R^3$ can be a hydrogen, except that each of $R^1$, $R^2$, $R^3$ cannot simultaneously be hydrogen, or $R^1$, $R^2$, $R^3$ are identical or different and are each a $C_1$–$C_{16}$-alkyl, a $C_1$–$C_{16}$-aryl, a $C_1$–$C_{16}$-alkenyl, a $C_1$–$C_{16}$-haloalkyl or a $C_1$–$C_{16}$-haloaryl, which comprises reacting in the presence of a metallocene-aluminoxane catalyst a first olefinic reactant comprised of one or more cycloolefins of the formulae II, III, IV, V, VI or VII

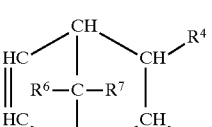
(II)

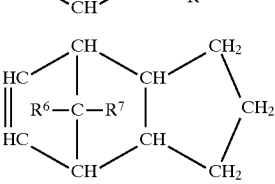
(III)

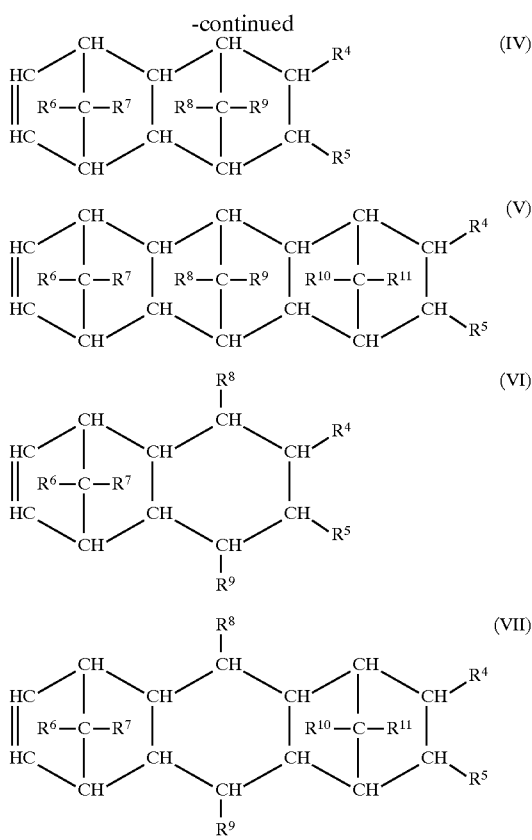

wherein $R^4$, $R^5$, $R^6$, $R^7$, $R^8$, $R^9$, $R^{10}$ and $R^{11}$ are identical or different and are each a hydrogen atom or a $C_1$–$C_{30}$-hydrocarbon radical or two or more radicals $R^4$ to $R^{11}$ are joined cyclically, with identical radicals in the various formulae being able to have a different meaning, with less than 25 mole % based on the total amount of monomers, of a second olefinic reactant comprised of a cyclic olefin of the formula VIII

wherein n is a number from 2 to 10, or an acyclic olefin having at least three carbon atoms of the formula IX

where $R^{12}$, $R_{13}$, $R^{14}$, $R^{15}$ are identical or different and are each a hydrogen atom or a $C_1$–$C_8$-alkyl or a $C_6$–$C_8$ alkyl or a $C_6$–$C_{14}$ aryl, wherein the cycloolefin polymer has at one or both ends an olefinically unsaturated group having at least three carbon atoms and wherein the olefinically unsaturated group is produced from an olefin that is different from the cycloolefins of the formulae II–VIII and the acyclic olefins of the formula IX and has the formula I

where any of $R^1$, $R^2$, $R^3$ can be a hydrogen, except that each of $R^1$, $R^2$, $R^3$ cannot simultaneously be hydrogen, or $R^1$, $R^2$, $R^3$ are identical or different and are each a $C_1$–$C_{16}$-alkyl, a $C_1$–$C_{16}$-aryl, a $C_1$–$C_{16}$-alkenyl, a $C_1$–$C_{16}$-haloalkyl or a $C_1$–$C_{16}$-haloaryl, wherein when the second olefinic reactant is a cycloolefin, the first and second reactants are different cycloolefins.

2. A process as claimed in claim 1 which further comprises reacting the first and second olefinic reactant of formulae II, III, IV, V, VI and VII, and VIII, respectively, with a third olefinic reactant compound of one or more acyclic olefins of the formula IX, wherein when the second olefinic reactant is an acyclic olefin, the second and third reactants are different acyclic olefins.

3. A process as claimed in claim 1 or 2, wherein the second olefinic reactant is selected from the group consisting of propylene, butene, isobutylene, pentene, hexene, heptene, octene, 4-methylpentene, butadiene, isoprene, cyclopentene, cyclohexane, vinylcyclohexane, vinylnorbornene, vinylcyclohexene, cyclopentadiene, dicyclopentadiene, styrene and a-methylstyrene.

4. A process as claimed in claim 1 or 2, wherein the reactants are reacted at temperatures of from –78° to 150° C. and a pressure of from 0.01 to 64 bar and wherein the transition metal catalyst comprises at least one cocatalyst and at least one transition metal compound.

5. The process according to claim 1 or 2 wherein the metallocene-aluminoxane catalyst system is isopropylene(1-cyclopentadienyl)(1-indenyl)zirconium-methylaluminoxane.

6. The process as claimed in claim 1 or 2 wherein the cycloolefin is norbornene or tetracyclododecane and the acyclic olefin is ethylene.

* * * * *